US005768019A

United States Patent [19]
Niwa et al.

[11] Patent Number: 5,768,019
[45] Date of Patent: Jun. 16, 1998

[54] REFLECTIVE SCREEN FOR A LIQUID CRYSTAL PROJECTOR AND METHOD FOR PRODUCING THE SAME

[75] Inventors: Masatoshi Niwa; Yoshikazu Umezawa; Hajime Maruta, all of Joetsu, Japan

[73] Assignee: Arisawa Mfg. Co., Ltd., Niigata-Ken, Japan

[21] Appl. No.: 562,096

[22] Filed: Nov. 22, 1995

[30] Foreign Application Priority Data

Jul. 25, 1995 [JP] Japan .................. 7-189418

[51] Int. Cl.$^6$ .................................. G02B 5/08
[52] U.S. Cl. .................. 359/602; 359/493; 359/449; 349/96; 349/113; 349/122; 349/137
[58] Field of Search .................. 359/485, 493, 359/602, 443, 449; 349/96, 113, 122, 137; 156/99

[56] References Cited

U.S. PATENT DOCUMENTS

| 3,682,531 | 8/1972 | Jeffers ........................ 359/493 |
| 4,351,681 | 9/1982 | Kamerling ..................... 156/99 |
| 4,387,133 | 6/1983 | Ichikawa et al. ............... 349/122 |
| 5,287,130 | 2/1994 | Umeda ......................... 353/20 |

FOREIGN PATENT DOCUMENTS

| 62-266980 | 11/1987 | Japan ....................... H04N 5/74 |
| 5204046 | 8/1993 | Japan ....................... G03B 21/60 |

OTHER PUBLICATIONS

Database WPI Section Ch, Week 8740, Derwent Publications Ltd., London, GB; Class A89, An 87-281056, XP002017829 & JP-A-62 195 604 (Toray Ind. Inc.), Aug. 28, 1987 *Abstract.

Database WPI Section Ch, Week 8512 Derwent Publications Ltd., London, GB; Class A89, An 85-071791, XP00217830 & JP-A-60 026 304 (Nitto Electric Ind KK) Feb. 9, 1985 *Abstract.

Database WPI Section Ch, Week 8432 Derwent Publications Ltd., Longdon, GB; Class A89, An 84-197285 XP002017831 & JP-A-59 111 114 (Sekisui Chemi Ind KK) Jun. 27, 1984, *Abstract.

*Primary Examiner*—Jon W. Henry
*Assistant Examiner*—Darren E. Schuberg
*Attorney, Agent, or Firm*—Sughrue, Mion, Zinn, Macpeak & Seas, PLLC

[57] ABSTRACT

To improve non-flammability, there is provided a reflective screen for a liquid crystal projector or display in an aircraft. An antireflective member holding an antireflective function on its surface is provided on a top surface of a polarizing film through urethane resin system adhesive, and a reflective member is provided on a bottom surface of the polarizing film through an acrylic resin system pressure sensitive adhesive.

22 Claims, 3 Drawing Sheets

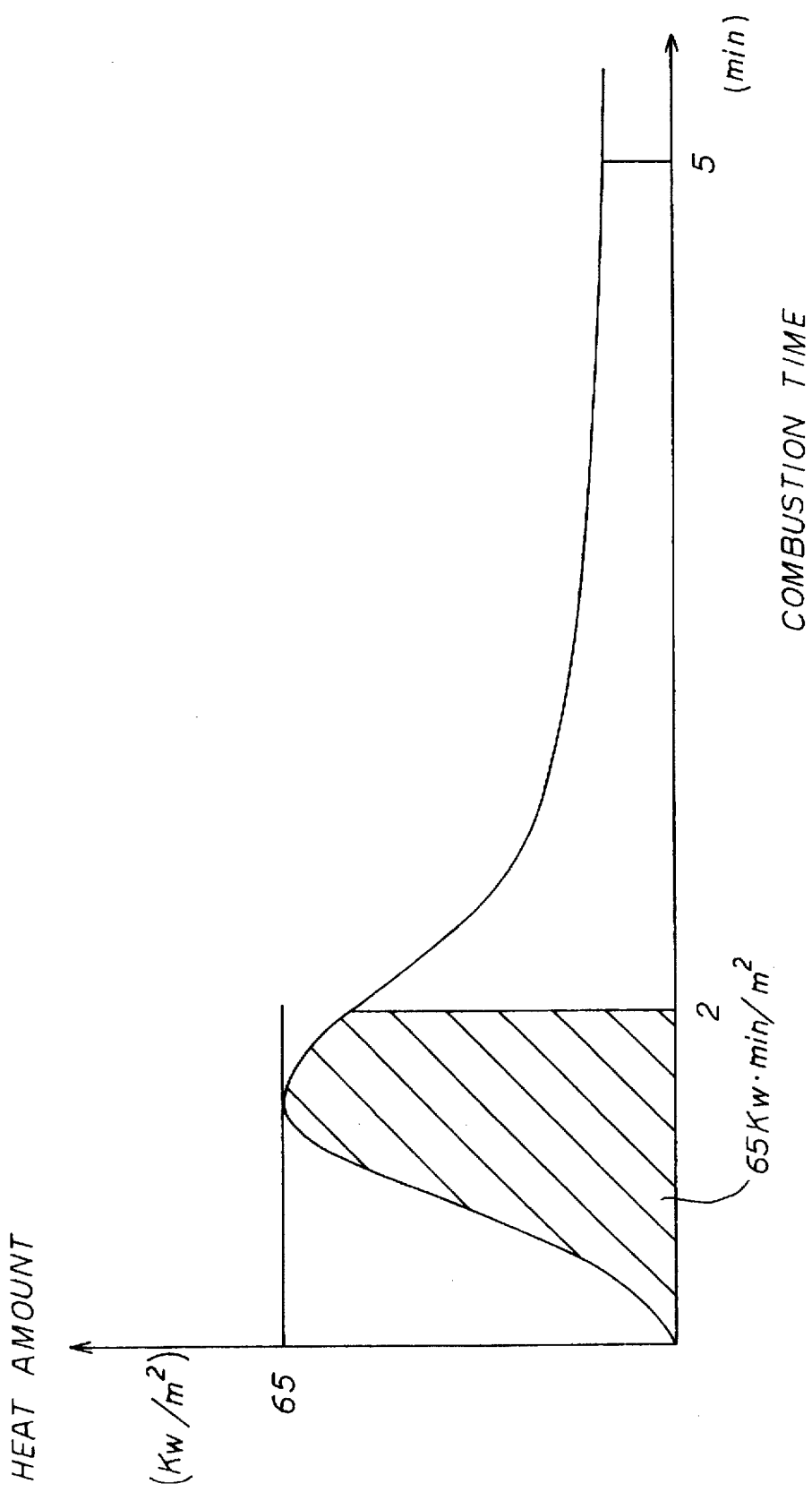

& 1

REFLECTIVE SCREEN FOR A LIQUID CRYSTAL PROJECTOR AND METHOD FOR PRODUCING THE SAME

BACKGROUND OF THE INVENTION

The present invention relates to a reflective type screen for a liquid crystal projector or display which is mainly used in an aircraft and a method for producing the same.

There have been various approaches to a screen on which a clear image may be projected even in a bright circumstance, for example, in a chamber.

For instance, in a screen which may prevent fading out of an image or reducing a contrast due to external light as in Japanese Patent Application Laid-Open No. 62-266980, a polarizing plate is provided for absorbing the external light and the effect of reflective light may be reduced.

Also, the application of such a screen having the polarizing plate to the equipment of an aircraft has been disclosed in Japanese Patent Application Laid-Open No. Hei 5-204046.

On board aircraft material to be mounted on an inflight aircraft to the United States must meet a very strict flammable or combustion standard stipulated by FAR 25.853 (U.S. Federal Aircraft Material Test Method) appointed by FAA (U.S. Federal Aviation Agency). Of course, the screen mounted on the aircraft is not excluded from this stipulation and should conform to the combustion standard.

For example, a screen having a structure shown in FIG. 1 has been conventionally proposed (which will hereinafter be referred to as a conventional example).

In this conventional example, a polarizing film 21 having a three layered structure and a thickness of approximately 120 μm which film is formed by sandwiching a PVA film (polyvinyl alcohol rosin film) with TAC films (triacetyl acetate resin films) is further sandwiched by a PP film (polypropylene resin film) used as an antireflective film 22 subjected to a matting treatment on its surface and having a thickness of approximately 25 μm and an aluminum plate used as an reflective member 23 having a thickness of about 1,000 μm. Incidentally, the polarizing film 21 and the antireflective film 22, and the polarizing film 21 and the reflective member 23 are cemented together by an acrylic resin system pressure sensitive adhesive 24 (having a thickness of about 20 μm).

This conventional example is not sufficient in non-flammability (which does not meet the FAA combustion standard). In addition, the weight of the article is large. This example is improper to be mounted on the aircraft (see FIG. 1).

Accordingly, in the industrial field, there is strong demand to provide a reflective screen for a liquid crystal projector, which is excellent in non-flammability to sufficiently meet the requirement defined by the combustion standard of the FAA (U.S. Federal Aviation Agency) and which is light in weight.

An object of the present invention is to provide a reflective screen for a liquid crystal projector which is superior in non-flammability to meet the requirement.

SUMMARY OF THE INVENTION

A first aspect of the present invention relates to a reflective screen for a liquid crystal projector in an aircraft characterized in that an antireflective member holding an antireflective function on its surface is provided on a top surface of a polarizing film through urethane resin system adhesive, and a reflective member is provided on a bottom surface of the polarizing film through an urethane resin system adhesive.

According to a second aspect of the present invention, there is provided a reflective screen for a liquid crystal projector in an aircraft characterized in that an antireflective member holding an antireflective function on its surface is provided on a top surface of a polarizing film through urethane resin system adhesive, and a reflective member is provided on a bottom surface of the polarizing film through an acrylic resin system pressure sensitive adhesive.

The polarizing film is preferably made of polyethyleneterephthalate resin in the form of a monolayer having a thickness of 30 μm or less.

The reflective member may be made of an aluminum alloy plate having a thickness of about 0.5 mm.

The reflective member may be also made of an aluminum alloy plate having a thickness of about 1.0 mm.

The urethane resin system adhesive may be about 5 μm thick, and the acrylic resin system pressure sensitive adhesive is about 20 μm thick.

According to the present invention, there is also provided a method for producing a reflective screen for a liquid crystal projector in an aircraft, comprising the following steps of:

coating and drying an urethane resin system adhesive on a glaring surface of mat type biaxially oriented polypropylene resin film in the form of a roll;

thereafter, pressure-bonding a polarizing film made of polyethyleneterephthalate resin in the form of a roll by using heating rolls;

subsequently, coating and drying an acrylic resin system pressure sensitive adhesive on a bottom surface of the polarizing film made of polyethyleneterephthalate resin in the form of the roll to thereby effect a pressure sensitive treatment; and subsequently, pressure-bonding an aluminum alloy plate having a predetermined length by rolls.

According to the present invention, there is also provided a method for producing a reflective screen for a liquid crystal projector in an aircraft, comprising the following steps of:

coating and drying an urethane resin system adhesive at a thickness of about 5 μm on a glaring surface of mat type biaxially oriented polypropylene resin film in the form of a roll;

thereafter, pressure-bonding a polarizing film made of polyethyleneterephthalate resin in the form of a roll and in the form of a monolayer having a thickness of 30 μm or less by using heating rolls;

subsequently, coating and drying an acrylic resin system pressure sensitive adhesive at a thickness of about 20 μm on a bottom surface of the polarizing film made of polyethyleneterephthalate resin in the form of the roll to thereby effect a pressure sensitive treatment; and subsequently, pressure-bonding an aluminum alloy plate having a predetermined length and a thickness of about 0.5 mm or 1.0 mm by rolls.

According to the present invention, inflammables are very much reduced so that the heat amount may be reduced upon combustion and the maximum heat amount may be reduced.

According to the present invention, it is possible to completely prevent any adverse effect to the screen surface by an external beam of light. The structure is superior in non-flammability enough to clear the conditions required by the combustion standard of FAA (U.S. Federal Aviation Agency). In addition, because of the light weight structure, it is possible to provide a reflective screen for a liquid crystal projector, which is very suitable to be mounted in the inflight area.

BRIEF DESCRIPTION OF THE DRAWINGS

In the accompanying drawings:

FIG. 3 is a graph showing a combustion curve of a standardized article under FAR 25.853.

DESCRIPTION OF THE PREFERRED EMBODIMENTS

The present invention will now be described with reference to the accompanying drawings.

Figure 1:
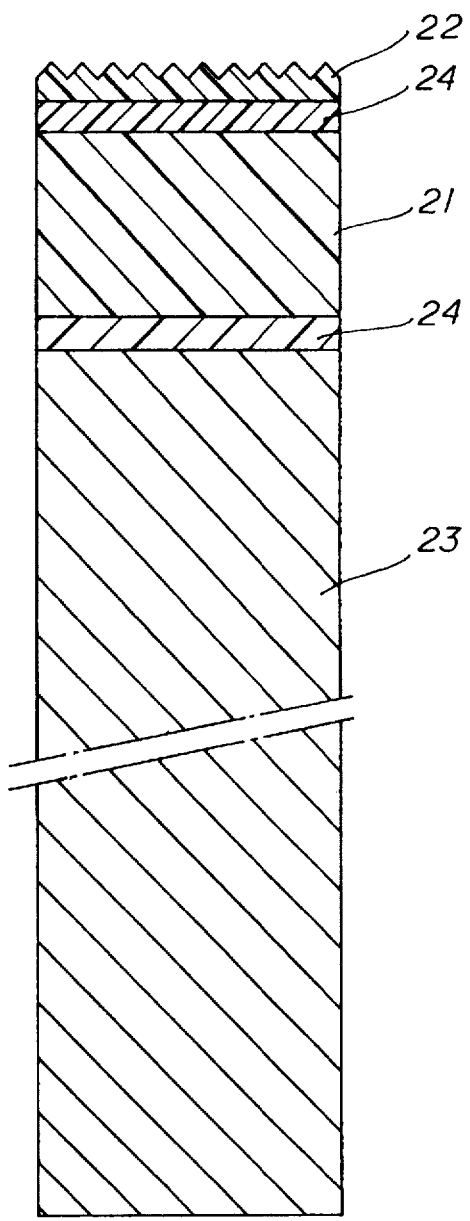
FIG. 1 is an illustrative cross-sectional view showing a conventional example.
Figure 2:
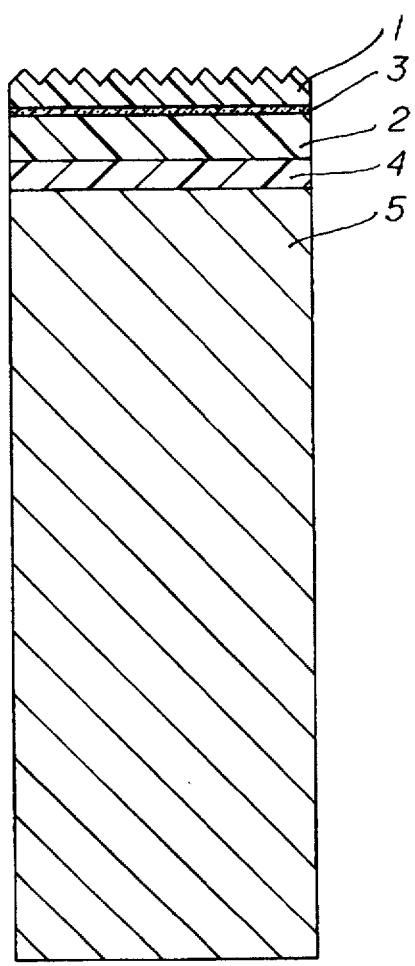
FIG. 2 is an illustrative cross-sectional view showing an embodiment of the invention.

FIG. 2 shows a first embodiment of the invention which will be described as follows.

A mat type OPP film (biaxially oriented polypropylene resin film: Toray YM-11#25) having a thickness of about 25 μm is used as an antireflective member 1. A polarizing film (Mitsui Toatsu Chemical MT-NH30) made of a PET film (polyethyleneterephthalate resin film) having a thickness of about 30 μm is used as a polarizing film 2. An aluminum alloy plate having a thickness of about 0.5 mm (made by Sky Aluminum, A5052-H34 0.5t) is used as a reflective member 5.

An urethane resin system adhesive 3 (Toyo Morton Co. AD-527) is applied to a glaring surface side of the above-described mat type OPP film (in the form of a roll) at a thickness of about 5 μm and dried (120° C., 5 minutes). Thereafter, a polarizing film (in the form of a roll) made of the above-described PET film is pressure-bonded by using heating rollers (continuous dry laminate method).

Subsequently, acrylic resin system pressure sensitive adhesive 4 (Soken Kagaku Co. AS-1925) having a pressure-sensitivity is coated on an under surface of the polarizing film made of the PET film at a thickness about 20 μm and is dried (120° C., 10 minutes) to effect a pressure sensitive treatment. Subsequently, the above-described aluminum alloy plate (having a predetermined length in the form of a plate) is pressure-bonded by rollers (batch laminate method).

Incidentally, it is well known that the urethane resin and the acrylic resin are excellent in non-flammability.

A second embodiment will now be described.

The structure according to the second embodiment is the same as that of the first embodiment except for using an aluminum alloy plate (by Sky Aluminum, A5052-H34 1.0t) having a thickness of about 1.0 mm as the reflective member 5.

The following Table 1 shows whether or not the first embodiment, the second embodiment and the conventional example would conform to the combustion standard stipulated under the above-described FAR 25.853 (U.S. Federal Aircraft Material Test Method) appointed by FAA (U.S. Federal Aviation Agency).

FIG. 3 is a graph showing a combustion curve of a standardized article under the combustion standard.

Incidentally, the size of the test pieces in accordance with the first embodiment, the second embodiment and the conventional example were 6 inches long and 6 inches wide (with a support member having a predetermined thickness).

TABLE 1

| Test item | Unit | Standard value | First ex. | Second ex. | Conv. ex. | Application test |
|---|---|---|---|---|---|---|
| Entire heat amount | kw. min/m² | 65 or less | 27.85 | 23.38 | 51.54 | FAR 25.853 |
| Max heat amount | kw./m² | 65 or less | 58.93 | 55.07 | 67.99 | FAR 25.853 |
| Weight of article | kw./m² | — | 1.4 | 2.8 | 2.9 | — |

— The entire heat amount under FAR 25.835 means all the heat amount up to 2 minutes after the ignition, and the maximum heat amount means the maximum heat amount at the peak of the combustion curve (see FIG. 3).

According to Table 1:

i) The maximum heat amount of the conventional example exceeds the standardized level, whereas that of the first and second embodiments is less than the standardized level.

ii) The entire heat amount of the first and second embodiments is suppressed down to about half the entire heat amount of the conventional example.

iii) The weight of the embodiments is small in comparison with the conventional example. In particular, the weight of the article of the first embodiment is much less than that of the conventional example by 1 kg/m. This is because the aluminum alloy used as the reflective member 5 in the first embodiment is thinner than that of the second embodiment (about 0.5 mm in the first embodiment and about 1.0 mm in the second embodiment). Also, with respect to the difference between the embodiments and the conventional example, in the embodiments, the urethane resin system resin adhesive 3 is used to reduce the thickness by 15 μm, and the polarizing film made of the PET film in the form of a monolayer structure is used as the polarizing film 2 to reduce the thickness of 90 μm.

iv) Comparing the first embodiment with the second embodiment, both the entire heat amount and the maximum heat amount of the second embodiment are less than those of the first embodiment. This is because the thickness of the reflective member 5 in the second embodiment (about 1.0 mm) is greater than that of the first embodiment (about 0.5 mm) to facilitate the absorption of heat. The structure exhibits the superiority in combustion characteristics (non-flammability) where the absorbed heat is radiated from the back side.

v) With respect to the first embodiment, the standardized levels are sufficiently met as described above, and furthermore, the structure is very suitable for the interior of the aircraft because it is light in weight.

vi) With respect to the second embodiment, it is apparent from the experimental result that the structure is superior in non- flammability although the weight of the article is heavier than that of the first embodiment. This suggests that the reflective member 5 having a different thickness should be prepared depending upon use in the field. In, for example, a movie theater where a fire accident would be liable to occur due to a large amount of flammable films and an installed large size screen is used, there is no need to reduce the weight. However, in the case where the nor-flammability is strongly demanded, the screen according to the second embodiment is preferable.

Accordingly, in either of the first and second embodiments, it is of course possible to completely prevent the adverse effect caused by the external light to the screen surface, and the flammable material is reduced to provide the screen that is excellent in non-flammability to sufficiently clear the conditions of the above-described combustion standard of FAA (U.S. Federal Aviation Agency). In particular, according to the first embodiment, it is possible to provide an extremely light weight screen.

It is well known that a necessary thickness of ordinary adhesive is smaller than that of pressure sensitive adhesive (in case of pressure sensitive adhesive which needs a thickness of 20 µm or more). Also, since the ordinary adhesive is subjected to cross-linking to be cured after the coating and drying treatment, it is not possible to leave the adhesive without any treatment. Thus, the workability is worse. In this respect, the pressure sensitive adhesive is better and may be left after the coating treatment. In this case, there is no problem such as curing. Accordingly, in order to reduce the amount of the flammable material as much as possible and to enhance the non-flammability and reduce the weight, if only the ordinary adhesive is used without using the pressure sensitive adhesive, it is possible to obtain a screen which is superior in non-flammability and weight reduction to the first and second embodiments. However, as described above, the ordinary adhesive has the problem in workability, i.e., manufacture. More specifically, as described above, since both mat type OPP film and polarizing film made of the PET film are in the form of rolls, there is no serious problem although the adhesive is used therefor, but the bonding with the aluminum alloy plate needs a drying step in the case where the ordinary adhesive is used since the aluminum alloy plate is a piece of plate. Also, in the latter case, the workability is worse due to the curing problem of the ordinary adhesive. Accordingly, the pressure sensitive adhesive should be used. Based on this consideration, in the embodiments, the acrylic resin system pressure sensitive adhesive 4 is used for bonding with the aluminum plate.

Incidentally, special adhesive which has both the properties of the adhesive and the pressure sensitive adhesive has recently been developed. It is of course possible to apply special such adhesive to the foregoing embodiments.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A reflective screen for a liquid crystal projector in an aircraft which exhibits non-flammable characteristics, comprising:
   an antireflective member having an antireflective function on its surface being provided on a top surface of a polarizing film using a urethane resin system adhesive; and
   a reflective member being provided on a bottom surface of said polarizing film using a urethane resin system adhesive;
   wherein the reflective screen has an entire heat amount less than about 27.85 Kw.min/m$^2$ and a maximum heat amount less than about 58.93 K/m$^2$.

2. A reflective screen for a liquid crystal projector in an aircraft which exhibits non-flammable characteristics comprising:
   an antireflective member having an antireflective function on its surface being provided on a top surface of a polarizing film using a urethane resin system adhesive; and
   a reflective member being provided on a bottom surface of said polarizing film using an acrylic resin system pressure sensitive adhesive;
   wherein the reflective screen has an entire heat amount less than about 27.85 Kw.min/m$^2$ and a maximum heat amount less than about 58.93 Kw/m$^2$.

3. The reflective screen according to claim 1, wherein said polarizing film is made of polyethyleneterephthalate resin in the form of a monolayer having a thickness of 30 µm or less.

4. The reflective screen according to claim 2, wherein said polarizing film is made of polyethyleneterephthalate resin in the form of a monolayer having a thickness of 30 µm or less.

5. The reflective screen according to claim 1, wherein said reflective member is made of an aluminum alloy plate having a thickness of about 0.5 mm.

6. The reflective screen according to claim 2, wherein said reflective member is made of an aluminum alloy plate having a thickness of about 0.5 mm.

7. The reflective screen according to claim 3, wherein said reflective member is made of an aluminum alloy plate having a thickness of about 0.5 mm.

8. The reflective screen according to claim 4, wherein said reflective member is made of an aluminum alloy plate having a thickness of about 0.5 mm.

9. The reflective screen according to claim 1, wherein said reflective member is made of an aluminum alloy plate having a thickness of about 1.0 mm.

10. The reflective screen according to claim 2, wherein said reflective member is made of an aluminum alloy plate having a thickness of about 1.0 mm.

11. The reflective screen according to claim 3, wherein said reflective member is made of an aluminum alloy plate having a thickness of about 1.0 mm.

12. The reflective screen according to claim 4, wherein said reflective member is made of an aluminum alloy plate having a thickness of about 1.0 mm.

13. The reflective screen according to claim 2, wherein said urethane resin system adhesive is about 5 µm thick, and said acrylic resin system pressure sensitive adhesive is about 20 µm thick.

14. The reflective screen according to claim 4, wherein said urethane resin system adhesive is about 5 µm thick, and said acrylic resin system pressure sensitive adhesive is about 20 µm thick.

15. The reflective screen according to claim 6, wherein said urethane resin system adhesive is about 5 µm thick, and said acrylic resin system pressure sensitive adhesive is about 20 µm thick.

16. The reflective screen according to claim 8, wherein said urethane resin system adhesive is about 5 µm thick, and said acrylic resin system pressure sensitive adhesive is about 20 µm thick.

17. The reflective screen according to claim 10, wherein said urethane resin system adhesive is about 5 µm thick, and said acrylic resin system pressure sensitive adhesive is about 20 µm thick.

18. The reflective screen according to claim 12, wherein said urethane resin system adhesive is about 5 µm thick, and said acrylic resin system pressure sensitive adhesive is about 20 µm thick.

19. A method for producing a reflective screen for a liquid crystal projector in an aircraft, comprising the following steps of:
   coating and drying an urethane resin system adhesive on a glaring surface of a rolled mat type biaxially oriented polypropylene resin film;
   thereafter, pressure-bonding a rolled polarizing film made of polyethyleneterephthalate resin to said rolled mat type biaxially oriented polypropylene resin film by using heated rollers;

subsequently, coating and drying an acrylic resin system pressure sensitive adhesive on a bottom surface of said rolled polarizing film made of polyethyleneterephthalate resin to thereby effect a pressure sensitive treatment; and subsequently, pressure-bonding, using said acrylic resin system pressure sensitive adhesive, an aluminum alloy plate having a predetermined length onto said rolled polarizing film by using rollers.

20. A method for producing a reflective screen for a liquid crystal projector in an aircraft, comprising the following steps of:

coating and drying an urethane resin system adhesive at a thickness of about 5 μm on a glaring surface of a rolled mat type biaxially oriented polypropylene resin film;

thereafter, pressure-bonding a rolled polarizing film made of polyethyleneterephthalate resin in the form of a monolayer having a thickness of 30 μm or less to said rolled mat type biaxially oriented polypropylene resin film by using heated rollers;

subsequently, coating and drying an acrylic resin system pressure sensitive adhesive at a thickness of about 20 μm on a bottom surface of said rolled polarizing film made of polyethyleneterephthalate resin to thereby effect a pressure sensitive treatment; and subsequently, pressure-bonding, using said acrylic resin system pressure sensitive adhesive, an aluminum alloy plate having a predetermined length and a thickness of at least one of 0.5 mm and 1.0 mm onto said rolled polarizing film by using rollers.

21. A reflective screen for a liquid crystal projector in an aircraft which exhibits non-flammable characteristics, comprising:

an antireflective member having an antireflective function on its surface being provided on a top surface of a polarizing film using a urethane resin system adhesive; and a reflective member being provided on a bottom surface of said polarizing film using a urethane resin system adhesive;

wherein the reflective screen has an entire heat amount less than about 23.38 Kw.min/m$^2$ and a maximum heat amount less than about 55.07 Kw/m$^2$.

22. A reflective screen for a liquid crystal projector in an aircraft which exhibits non-flammable characteristics comprising:

an antireflective member having an antireflective function on its surface being provided on a top surface of a polarizing film using a urethane resin system adhesive; and a reflective member being provided on a bottom surface of said polarizing film using an acrylic resin system pressure sensitive adhesive;

wherein the reflective screen has an entire heat amount less than about 23.38 Kw.min/m$^2$ and a maximum heat amount less than about 55.07 Kw/m$^2$.

* * * * *

UNITED STATES PATENT AND TRADEMARK OFFICE
CERTIFICATE OF CORRECTION

PATENT NO. : 5,768,019
DATED : June 16, 1998
INVENTOR(S) : Masatoshi NIWA, Yoshikazu UMEZAWA, and Hajime MARUTA It is certified that errors appear in the above-identified patent and that said Letters Patent is hereby corrected as shown below:

Column 1, line 35, change "rosin" to --resin--;

Column 4, line 27, change "Kg/m" to --Kg/m$^2$--;

line 63, change "nor-flammability" to --non-flammability--; and

Column 5, line 40, change "special such adhesive" to --such special adhesive--.

Signed and Sealed this

Fifteenth Day of December, 1998

*Attest:*

BRUCE LEHMAN

*Attesting Officer*    *Commissioner of Patents and Trademarks*